(12) United States Patent
Naylor et al.

(10) Patent No.: US 7,615,258 B2
(45) Date of Patent: Nov. 10, 2009

(54) METHOD OF TREATING POLYMERS

(75) Inventors: Gareth Ian Naylor, Halifax (GB); Anne Flisher, Halifax (GB)

(73) Assignee: Ciba Specialty Chemicals Water Treatments Ltd., West Yorkshire, Bradford (GB)

( * ) Notice: Subject to any disclaimer, the term of this patent is extended or adjusted under 35 U.S.C. 154(b) by 295 days.

(21) Appl. No.: 11/631,447

(22) PCT Filed: Jul. 8, 2005

(86) PCT No.: PCT/EP2005/007412

§ 371 (c)(1),
(2), (4) Date: Jan. 3, 2007

(87) PCT Pub. No.: WO2006/007997

PCT Pub. Date: Jan. 26, 2006

(65) Prior Publication Data

US 2008/0033070 A1 Feb. 7, 2008

(30) Foreign Application Priority Data

Jul. 21, 2004 (GB) ................. 0416285.5

(51) Int. Cl.
*C08F 2/50* (2006.01)
*C08J 3/28* (2006.01)

(52) U.S. Cl. .......... 427/517; 427/457; 427/508; 427/512; 427/595; 523/111; 523/300; 522/6; 522/31; 522/42; 522/113; 522/129; 522/130; 522/150; 522/153; 522/178; 522/182; 524/800; 524/916

(58) Field of Classification Search ........... 522/42, 522/85, 6, 31, 113, 129, 130, 150, 153, 178, 522/182; 523/300, 111; 427/457, 508, 512, 427/517, 595; 524/800, 916, 827, 831
See application file for complete search history.

(56) References Cited

U.S. PATENT DOCUMENTS

| 4,506,062 | A | | 3/1985 | Flesher et al. | 526/211 |
|---|---|---|---|---|---|
| 4,528,321 | A | | 7/1985 | Allen et al. | 524/761 |
| 4,599,379 | A | | 7/1986 | Flesher et al. | 524/801 |
| 4,783,510 | A | * | 11/1988 | Saotome | 525/329.7 |
| 4,906,732 | A | | 3/1990 | Farrar et al. | 528/492 |
| 4,996,251 | A | | 2/1991 | Farrar et al. | 524/17 |
| 5,185,385 | A | | 2/1993 | Kanluen et al. | 522/84 |
| 5,372,766 | A | * | 12/1994 | Roe | 264/126 |
| 6,262,141 | B1 | * | 7/2001 | Cywar et al. | 522/42 |
| 6,803,392 | B1 | | 10/2004 | Kohler et al. | 522/64 |
| 2002/0114775 | A1 | | 8/2002 | Pathak | 424/78.17 |
| 2002/0188036 | A1 | * | 12/2002 | Flesher et al. | 522/86 |
| 2004/0077744 | A1 | | 4/2004 | Naylor et al. | 522/150 |
| 2005/0095371 | A1 | * | 5/2005 | Braun et al. | 427/558 |

FOREIGN PATENT DOCUMENTS

| EP | 0 102 760 | 3/1984 |
|---|---|---|
| EP | 0 126 528 | 11/1984 |
| EP | 0 150 933 | 8/1985 |
| WO | 97/29136 | 8/1997 |
| WO | 01/29093 | 4/2001 |
| WO | 01/55228 | 8/2001 |
| WO | 02/066520 | 8/2002 |
| WO | 2005/072487 | 8/2005 |

OTHER PUBLICATIONS

Exxon Mobil Chemical FAQS Sheet, 2002.*

* cited by examiner

*Primary Examiner*—Sanza L McClendon
(74) *Attorney, Agent, or Firm*—Shiela A. Loggins

(57) ABSTRACT

A method of reducing unreacted monomer in a water-soluble or water swellable polymer comprising the steps, i) applying an ultraviolet initiator to the surface of the polymer and ii) irradiating the polymer with ultraviolet light, wherein the ultraviolet initiator is dissolved or dispersed in a liquid medium and in which the liquid medium comprises an organic compound. The method is useful for reducing in the amount of unreacted acrylamide in polyacrylamide. Also claimed is a liquid initiator composition comprising, i) an ultraviolet initiator, and ii) a liquid medium comprising an organic compound. The initiator system is useful for applying to the surface of a polymer, such as polyacrylamide, in the removal of unreacted monomer, such as acrylamide.

18 Claims, No Drawings

METHOD OF TREATING POLYMERS

The present invention relates to a method for reducing unreacted monomer in water-soluble or water-swellable polymers. The invention also concerns an liquid initiator composition, especially for use in the treatment of water-soluble or water-swellable polymers for the reduction of unreacted monomer.

Water soluble and water swellable polymers are used in numerous industrial applications, for instance, flocculants, coagulants, rheology modifiers, dispersants, superabsorbents and binders. Of particular importance are high molecular weight water soluble polymeric flocculants which may be used as retention or drainage aids in paper making or to flocculate sludges such as sewage sludge, waste waters, textile industry effluents red mud from the Bayer Alumina process and suspensions of coal tailings etc.

It is standard practice to prepare water soluble or water swellable polymers by polymerising water soluble monomers using a suitable initiator system. The polymers are usually provided either as a solid particulate product or as a reverse phase dispersion or emulsion. Typically particulate polymers are prepared introducing initiators into an aqueous solution of the monomers and polymerising to form a polymer gel which is then cut into smaller pieces, dried and then ground to the appropriate particle size. Alternatively the polymers are produced as beads by suspension polymerisation or as a water-in-oil emulsion or dispersion by water-in-oil emulsion polymerisation, for example according to a process defined by EP-A-150933, EP-A-102760 or EP-A-126528.

It is known to produce water soluble and water swellable polymers using a variety of initiator systems. For instance it is common practice to polymerise water soluble monomers using redox initiator couples, in which radicals are generated by admixing with the monomer a redox couple which is a reducing agent and an oxidising agent. It is also conventional practice to use either alone or in combination with other initiator systems a thermal initiator, which would include any suitable initiator compound that releases radicals at an elevated temperature. Other initiator systems include photo and radiation induced initiator systems, which require exposure to radiation to release radicals thereby effecting polymerisation. Other initiator systems are well known and well documented in the literature.

Although water soluble and water swellable polymers can be prepared using many of the commercially available initiator systems, it is often difficult to prepare on an industrial scale polymers which have the correct molecular weight in combination with other desired characteristics, such as solubility, degree of absorbency etc. Over the last ten to fifteen years it has also become increasingly important to provide polymers which have extremely low levels of residual free monomer. This is particularly the case for polymers based on acrylamide monomer.

There have been various proposals in the literature for reducing residual free monomer concentrations in polymers, especially polymers of acrylamide. For instance in U.S. Pat. No. 4,906,732 and U.S. Pat. No. 4,996,251 polyacrylamides are treated with an amidase enzyme which is active towards acrylamide. However, although it was possible to achieve very low levels of free acrylamide, the enzymes proposed in these patents cannot consistently achieve this objective especially at elevated temperatures. In addition when the amidase enzyme is applied to the surface of polymer gels, sufficient residence time has to be allowed in order for the unreacted monomer to be removed.

WO-A-97 29136 describes an amidase enzyme which is particularly effective at high temperatures and thus can be applied to the hot polymer gel substantially immediately prior to the drying stage. However, although this enzyme has shown particular advantages over other known amidases, it is still nonetheless difficult to consistently achieve low residual levels of acrylamide on an industrial scale.

In WO 01/55228 a process of preparing water soluble or water swellable polymer is described in which aqueous monomer mixture containing ultra violet light initiators is first polymerised in the absence of ultra violet light and then once polymerisation is complete the polymer is subjected to ultra violet light radiation at an intensity of up to 500 milli Watts. This process brings about significant benefits in providing the desired water soluble or water swellable polymer containing reduced residual unreacted monomer. In an alternative version photo initiator is applied to the surface of the formed polymer and allowed to coat it before irradiating with UV light.

WO 02/66520 describes a process of preparing water soluble or water swellable polymer from an aqueous mixture containing water-soluble ethylenically unsaturated monomer or monomer blend, at least one first ultraviolet initiator and at least one second ultraviolet initiator. The polymerisation is effected by irradiation with ultraviolet light at an intensity of up to 1000 $\mu Wcm^{-2}$, during which a significant amount of the first initiator is activated. The polymer thus formed is then subjected to ultraviolet irradiation at an intensity of above 1000 $\mu Wcm^{-2}$, in which a significant amount of the second initiator is activated. This process very effectively provides polymers containing low free monomer. According to a further aspect mentioned in this reference, the water-soluble or water swellable polymer may be subjected to ultraviolet radiation in the presence of ultraviolet initiator. The ultraviolet initiator may be applied to the surface of the formed polymer and allowed to coat the surface of the polymer particles followed by subjecting the polymer to UV radiation. It is stated that the UV initiator would be absorbed into the polymer which is then distributed throughout the polymer before being subjected to irradiation by UV light.

In general previous attempts to reduce unreacted monomer in water soluble or water swellable polymers, in particular particulate polymers, have relied upon incorporating a suitable catalyst in the monomer such that the catalyst remains in the matrix of the polymer particle. The catalyst would then be activated to remove the residual monomer. It might be thought that if the catalyst is distributed throughout the matrix of the polymer and it would be more likely to achieve the objective of removing monomer.

However, there is still scope for improvements and a desire to provide a still more convenient process that reduces free monomer and at the same time reduces processing time, without impairing the quality of the polymer formed. The object of the present invention is therefore to be of up to more conveniently and more consistently provide water soluble or swellable polymers with no or extremely low levels of residual monomer, especially acrylamide monomer. It is desirable to achieve this objective in an industrial scale process that does not require additional long residence stages in the production process.

According to the present invention we provide a method of reducing unreacted monomer in a water-soluble or water-swellable polymer comprising the steps, i) applying an ultraviolet initiator to the surface of the polymer and ii) irradiating the polymer with ultraviolet light, wherein the ultraviolet initiator is dissolved or dispersed in a liquid medium and in which the liquid medium comprises an organic compound.

The application of ultraviolet initiator to the surface of polymer followed by irradiation with ultraviolet light in this liquid medium unexpectedly has been found to very effectively reduce unreacted monomer. Generally it would be expected that the process of reducing free monomer distributed throughout the matrix of a polymer particle by the application of a catalyst to the surface of the said polymer particle would take a considerable amount of time. Furthermore, given that ultraviolet initiators and radicals formed therefrom are labile it might be expected that merely applying ultraviolet initiators to the surface of the polymer particle that upon irradiation the radicals formed therefrom would be used up very quickly at the surface and leave large amounts of unreacted monomer in the centre of the polymer particles. However, we find that unreacted monomer was significantly reduced, especially for gel chips and relatively large sized polymer particles. The treatment results in a uniform reduction in free monomer.

According to the method of the invention the ultraviolet initiator is applied to the surface of the polymer as a liquid containing an organic compound. In a further aspect of the present invention we provide an initiator composition comprising, i) an ultraviolet initiator, and
ii) a liquid medium comprising an organic compound.

This initiator composition is particularly suitable for reducing unreacted monomer in accordance with the first aspect of the present invention.

In accordance with the method and the composition the initiator may be dispersed in a suitable liquid vehicle or preferably it is dissolved in a suitable liquid solvent. In order to ensure maximum efficiency of the initiator it is important that the choice of initiator and liquid vehicle or liquid solvent are compatible and that the solvent does not interact adversely with initiator or the radicals formed therefrom.

The organic compound is desirably liquid at the temperature of application. When the organic compound is a liquid medium it is necessary for it to be a liquid at the temperature of the process. Desirably the organic compound should be liquid at 10° C. Usually the compound will be a liquid over the temperature range of 10° C. to 50 or 60° C. or higher. Preferably the organic compound will have a melting point or upper end of a melting point range up to 10° C., for instance −30° C. to 10° C. More preferably organic compound will have a boiling point or upper end of a boiling point range of at least 50° C., for instance 50° C. to 250° C.

The liquid may be aqueous and the organic compound is either soluble in or miscible with the aqueous liquid. In this case the initiator would usually be dispersed, emulsified or dissolved in the aqueous medium. Alternatively the liquid may be anhydrous and contain the organic compound substantially in the absence of water and the initiator is dissolved or dispersed therein. Preferably the liquid is the organic compound and the initiator is dissolved in the organic compound.

Preferably the organic compound is an organic hydroxy compound.

Preferred organic compounds are selected from the group consisting of alcohols, ketones, aldehydes and ethers. Suitably the compound is selected from the group consisting of $C_{1-20}$ alcohols, $C_{1-20}$ aldehydes, and $C_{3-20}$ ketones.

Preferably the initiator is contained within a liquid composition which will readily be distributed over the surface of the polymer. For this purpose we usually find that the liquid initiator composition should have a viscosity below 30,000 cps (measured using a suspended level viscometer at 25° C.). Preferably the liquid initiator composition has a viscosity below 3000 cps. Generally the liquid will have a viscosity of at least 0.5 cps and usually at least 1 cps and typically the liquid has a viscosity in the range 2 or 3 to 1000 cps. Preferably the liquid has a viscosity in the range 5 to 70 cps, most preferably 10 to 50 cps.

A suitable initiator composition will comprise a dissolved ingredient that allows the liquid initiator composition to have the right sort of flow characteristics and enable the liquid to form at least a partial coating over the surface of the polymer. In addition, where the liquid initiator composition is aqueous it may be necessary to incorporate into the aqueous composition a substance that prevents or inhibits hydration of the water-soluble or water swellable polymer. It is also important that the initiator is uniformly distributed throughout the liquid medium. Surprisingly, we have found that when the liquid medium is an organic compound, such as an alcohol or a hydroxy terminated polyalkylene glycol, ketone, aldehyde, ether or hydrocarbon, an improved distribution of ultraviolet initiator can be achieved. This is especially so for alcohols and hydroxy terminated polyalkylene glycols.

Preferably the organic compound is selected from the group consisting of aliphatic and aromatic unsubstituted alcohols. More preferably the organic compound is a hydroxy compound and is an alcohol or a hydroxy terminated polyalkylene glycol. When the hydroxy compound is an alcohol, it will generally in contain up to 30 carbon atoms. It may be a fatty alcohol, for instance having at least 8 carbon atoms, such as $C_{16-20}$ straight or branched-chain alcohols. Desirably the alcohol is a $C_{1-30}$ alcohol, for instance methanol, ethanol, n-propanol, iso-propanol, n-butanol, iso butanol or tertiary butanol. Preferably the alcohol will be a alcohol least 6 carbon atoms and up to 20 carbon atoms. Suitable examples of preferred alcohols include isobornyl alcohol, iso-decanol, 2-phenoxy ethanol, hexane diol, tri propylene glycol, trimethylolpropane, trimethylol ethoxy propane.

When the organic compound is a hydroxy compound such as a polyalkylene glycol and it may for instance the a polypropylene glycol, but preferably it is a polyethyleneglycol.

Alternatively, substituted polyalkylene glycols, for instance mono alkyl or di alkyl end capped polyethylene glycols may be used as the organic compound provided that this liquid at the temperature of application or dissolved in a suitable solvent to form a liquid composition.

The liquid initiator medium may be anhydrous in which the liquid medium component is the organic compound. A preferred initiator composition comprises and organic hydroxy compound as liquid medium and more preferably is a liquid polyalkylene glycol and the initiator. Typically the polyalkylene glycol is a polypropylene glycol but is preferably a polyethylene glycol, especially having a molecular weight between 200 and 600, particularly PEG 200, PEG 300 and PEG 400.

Alternatively the organic compound is a hydrocarbon. Typically the hydrocarbon may contain between 10 and 40 carbon atoms. Desirably the hydrocarbon may be a lube oil for instance Solvent N150 or Solvent D40.

When the organic compound is a hydrocarbon usually the ultraviolet initiator would be dispersed or emulsified in the liquid medium. Typically this can be achieved by including in the liquid medium a surfactant or emulsifier that is soluble in the hydrocarbon or liquid medium in which the hydrocarbon is contained. Suitable surfactants or emulsifiers can typically be conventional surfactant or emulsifiers having a hydrophilic lipophilic balance (HLB) below 8, for instance 2 to 6.

The water soluble or water swellable polymer is generally prepared by polymerisation of a water soluble monomer or water soluble monomer blend. By water soluble we mean that the water soluble monomer or water soluble monomer blend has a solubility in water of at least 5 g in 100 ml of water, measured at 25° C. The polymerisation step (b) may employ conventional polymerisation techniques.

The water soluble or water swellable polymer may be cationic, anionic, nonionic or amphoteric. It may be substantially linear or alternatively branched or cross-linked. Cross-linked or branched polymers are prepared by incorporating a branching or cross-linking agent into the monomer blend. The cross-linking or branching agent may be for instance a di- or multifunctional material that reacts with functional groups pendant on the polymer chain, for instance multivalent metal ions or amine compounds which can react with pendant carboxylic groups. Preferably, however, the cross-linking or branching agent will be a polyethylenically unsaturated compound, which becomes polymerised into two or more polymer chains. Typically such cross-linking agents include methylene-bis-acrylamide, tetra allyl ammonium chloride, tri-allyl amine and polyethylene glycol di acrylate. The polymers may be highly crosslinked and therefore water insoluble but water swellable. Alternatively the polymer may be water soluble and either substantially linear or slightly branched, for instance prepared using less than 10 ppm cross-linking/branching monomer.

The water soluble or water swellable polymer may be cationic, anionic, amphoteric or non-ionic. Anionic polymers may be formed from one or more ethylenically unsaturated anionic monomers or a blend of one or more anionic monomers with for instance a nonionic monomer, preferably acrylamide. The anionic monomers include acrylic acid, methacrylic acid, maleic acid, crotonic acid, itaconic acid, vinylsulphonic acid, allyl sulphonic acid, 2-acrylamido-2-methylpropane sulphonic acid and salts thereof. A preferred anionic polymer is the copolymer of sodium acrylate with acrylamide.

Cationic polymers may be formed from one or more ethylenically unsaturated cationic monomers optionally with for instance a nonionic monomer, preferably acrylamide. The cationic monomers include dialkylamino alkyl (meth) acrylates, dialkylamino alkyl (meth) acrylamides, including acid addition and quaternary ammonium salts thereof, diallyl dimethyl ammonium chloride. Preferred cationic monomers include the methyl chloride quaternary ammonium salts of dimethylamino ethyl acrylate and dimethyl aminoethyl methacrylate.

Amphoteric polymers include at least one cationic monomer (for example as defined above) and at least one anionic monomer (for example as defined above) optionally with a nonionic monomer, especially acrylamide.

Non-ionic polymers include polymers of any suitable non-ionic monomers, for instance, acrylamide, methacrylamide, N-vinylpyrrolidone and 2-hydroxyethyl acrylate. Preferred non-ionic polymers comprise acrylamide especially acrylamide homopolymers.

The method is a particular value when the water soluble or water swellable polymer is a polyacrylamide and the unreacted monomer is acrylamide.

The polymer may be a relatively low molecular weight, for instance polymerised to a molecular weight below 100,000, for instance 2,000 to 10,000. Preferably however, the polymers are relatively higher molecular weight, for instance at least 100,000, especially at least 500,000. Typically the polymer has a molecular weigh in the range of above 1 million to 20 or 30 million or higher. In general these high molecular weight polymers tend to exhibit high intrinsic viscosities (IV), for instance at least 3 dl/g (measured at various polymer concentrations using standard techniques in 1N NaCl buffered to pH 7.5 at 25° C.). Preferably the polymer has an IV of at least 4 dl/g often at least 7 or 8 dl/g, for instance at least 12 dl/g. In some cases it may be highly desirable for the polymer to have an IV as high as 20 or 30 d l/g or even higher. However especially preferred polymers have an IV in the range 8 to 18 dl/g.

For the purpose of applying the ultraviolet initiator, the polymer may be in any convenient physical form, for instance as a partially hydrated gel or alternatively as substantially dry particles. Desirably the polymer may be in the form of blocks, gel chips, beads, granules, powder or filaments. Typically such particulates can have a cross-sectional diameter up to 15 or 20 mm. Therefore desirably the polymer is particulate and has a particle size diameter up to 15 mm, preferably 0.05 mm to 15 mm.

The concentration of ultraviolet initiator is generally included in initiator composition in an amount up to 33% by weight. It can be as low as 1 or 2%, but is generally at least 3% by weight. Typically it will be in the range of 10 to 20%.

The dose of initiator applied to the polymer is generally between 300 ppm and 5000 ppm initiator by weight as applied to the undried hydrated polymer gel, comprising approximately 35% polymer and 65% water. The dose may for instance be between 600 and 3,000 ppm, for instance 1000 and to 2000 ppm.

The liquid initiator composition may be applied to the polymer by any suitable technique. For instance the liquid may be poured over the surface of the polymer. This may be achieved by holding the aqueous initiator composition in a reservoir, wherein the composition is allowed flow over a weir to form a continuous curtain of liquid which flows and to the surface of the polymer, which is moving on a suitable carrier. Preferably however, the liquid initiator composition is sprayed on to the polymer. This may be achieved using a single spray nozzle, but preferably employs a multiplicity of spray nozzles. The position of the spray nozzles relative to the polymer should be so that maximum coverage of the polymer surface can be achieved without overdosing.

Once applied the initiator composition should desirably form a coating over the surface of the polymer. The polymeric surface may be completely coated by the initiator composition, although we generally find that optimum effectiveness in free monomer reduction can be achieved provided that there is a substantial covering. Preferably at least 40% of the exposed polymer surface area should be coated by the liquid initiator composition. More preferably at least 50% or 60% of the polymer surface should be coated. Most preferably at least 70% or 80% of the surface should be coated and maximum effectiveness is generally achieved when at least 90% or 95% of the polymer surface is contacted by the liquid initiator composition.

Preferably the ultra violet initiator is a compound of formula:

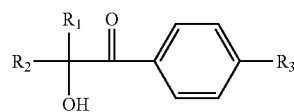

wherein $R_1$ and $R_2$ are each independently $C_{1-3}$ alkyl or together form a $C_{4-8}$ cycloaliphatic ring, $R_3$ is H, $C_{1-2}$ alkyl or —O(CH$_2$CH$_2$)$_n$OH and n is 1-20. An especially preferred ultra violet initiator is the compound defined by the formula,

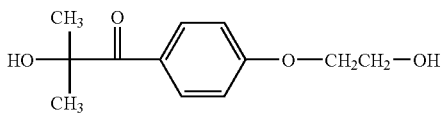

known as 1-[4-(2-Hydroxyethoxy)-phenyl]-2-hydroxy-2-methyl-1-propane-1-one supplied as Irgacure® 2959 photoinitiator by Ciba Specialty Chemicals.

Another especially preferred UV initiator is the compound of the formula,

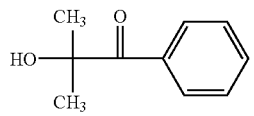

known as 1-phenyl-2-hydroxy-2-methyl-1-propane-1-one supplied as Darrocur ® (1173 photoinitiator by Ciba Specialty Chemicals.

Irgacure® 2959 and Darrocur® 1173 both dissolved in water at concentrations convenient for use. Consequently either of these initiators are especially suitable for use in aqueous liquid initiator compositions for use in the invention. These initiators are also compatible with the liquid polyethylene glycols and are suitable for use in the liquid initiator compositions formed therefrom.

Desirably the ultra violet initiator is used in an amount up to 10,000 ppm by weight of polymer. However, for economic reasons it is usually preferred not to use more than about 5,000 ppm. Suitable results are often obtained when the ultra violet initiator is included in an amount in the range 50 to 3,000 ppm, more preferably 100 to 2,500 ppm, especially 500 to 2,000 ppm.

Once the surface of the polymer has been treated by application of the ultraviolet initiator, the treated polymer is then irradiated using ultraviolet light. The three ultraviolet ranges (UVA, UVB and UVC) are suitable for the process. The wavelengths of the three regions are as follows: UVA is 320 to 400 nm; UVB is 290 to 320 nm; and UVC is 100 to 290 nm. The wavelengths corresponding to UVA and UVB are preferred since it is possible to use a wider range of intensities and longer irradiation. Thus the exact intensity and period of irradiation is not quite so critical when using UVA or UVB light as compared to the shorter wavelength UVC light.

Generally any suitable ultra violet light source that generates the appropriate light intensity may be used. Various types of lamps may be used to achieve the desired radiation treatment. For instance a Nordson UV lamp with Aquacure quartz cooling tubes, a MAC 10 lamp with pyrex dichroic reflectors. Preferably a relatively low wattage lamp is preferred, for instance a Philips Actinic 09 40W lamp may be used to generate the ultra violet light of intensity up to 1,000 µWcm$^{-2}$. A Fusion F600 lamp with a D bulb 6 KW may be used to generate UV light with an intensity of greater than 1,000 µWcm$^{-2}$. Generally intensity of ultraviolet light to use in accordance with the present invention may be up to 600 mW/cm$^2$ (measurements are determined using the Solatell). Preferably the intensity is in the range of 1 to 50 mW/cm$^2$, more preferably 2 to 20 mW/cm$^2$.

According to a preferred aspect of the invention, the polymer is made by gel polymerisation to form a hydrated gel polymer. Typically this is achieved by providing an aqueous solution of water-soluble ethylenically unsaturated monomers (for instance as described above) at a suitable concentration, for instance 20 to 50% by weight, preferably around 25 or 30% to 35 or 40%. The aqueous monomer solution is polymerised using any suitable conventional polymerisation technique. This may for instance involve the use of redox initiators, thermal initiators, photo initiators or any combination of these. Use of a redox initiator couple together with a thermal initiator is particularly preferred. Gel polymerisation of the aqueous monomer solution will form a hydrated gel polymer. The hydrated gel polymer is then comminuted to form gel chips. The chips are dried followed by grinding to form a powder. Generally the gel chips will have a size up to about 15 mm, usually in the range 0.05 to 15 mm, especially 2 or 3 to 5 mm. The powder will normally have a particle size up to about 2 mm, for instance 90% by weight in the range 300 to 1000 microns. According to this aspect of the invention in the ultraviolet initiator is applied to the surface of the polymer at any convenient stage.

Thus the ultraviolet initiator may be applied directly to the hydrated gel polymer following polymerisation but before comminution. However, it is preferred that the initiator is applied to the polymer during the process of comminution of the hydrated gel or subsequently. In one preferred form the ultraviolet initiator is applied to the surface of the gel chips. In another preferred form of the invention where the initiator is applied during comminution, wherein a lubricant is used to facilitate the comminution process, the ultraviolet initiator is comprised in the lubricant. Preferably the lubricant is a liquid polyalkylene glycol, especially in a liquid polyethylene glycol as defined above, comprising the ultraviolet initiator and consequently made of the same liquid initiator composition as described above.

The irradiation of the gel chips or polymeric particles may be conducted simultaneously with the drying process. Thus in one preferred form the gel chips may be dried using a band drying system in which the gel chips are placed on a sieve within a tubular section through which an updraft of hot air is passed. The gel chips are simultaneously irradiated by ultraviolet light from above. In another form the gel chips may be dried using a fluid bed drying system in which the gel chips are suspended on an updraft of hot air within a tubular section which is transparent to ultraviolet light. As the gel chips are being dried on the bed of air they are simultaneously being irradiated by ultraviolet light from a laterally positioned light source.

Alternatively the polymer is made by reverse phase polymerisation. In this form of the invention and aqueous monomer solution is held within a continuous phase water immiscible liquid and polymerised by for instance suspension polymerisation, emulsion polymerisation or microemulsion polymerisation.

The polymer can therefore be made by reverse phase suspension polymerisation in a continuous phase water immiscible liquid to form polymeric beads. Once the polymerisation is complete the beads are separated from the water immiscible liquid. Optionally the beads may be subjected to a drying step. One way of substantially dehydrating the beads is by subjecting them to vacuum distillation while they are dispersed in the water immiscible liquid. The ultraviolet initiator may be applied to the polymeric beads either by introducing the ultraviolet initiator into the continuous phase water immiscible liquid after completion of the polymerisation or by applying the ultraviolet initiator to the surface of the polymeric beads after separation from the continuous phase water immiscible liquid. Where the ultraviolet initiator is applied after the separation from the water in this will liquid, a liquid initiator composition, preferably an initiator composition or a liquid polyalkylene glycol initiator composition, may be used as described previously. Alternatively the ultraviolet initiator is introduced into the continuous phase water immiscible liquid and as the continuous phase liquid is in contact with the surface of the polymer beads, the initiator dissolved or dispersed therein is allowed to come into contact with the polymer beads. The initiator may either be dissolved or dispersed within the continuous phase water immiscible liquid. The dispersion of polymer beads in the water immiscible liquid is then irradiated with the appropriate treatment by ultraviolet light. This may for instance be achieved by passing the suspension of polymer beads along a transparent pipe or plate through which the suspension is irradiated.

In a further form of the invention the polymer is made by reverse phase emulsion polymerisation in a continuous phase water immiscible liquid to form an emulsion product, which is then optionally dehydrated by vacuum distillation. The ultraviolet initiator is introduced into the continuous phase water immiscible liquid after completion of the polymerisation. In this way initiator is allowed to contact the surface of the emulsified polymer of the dispersed phase. The irradiation with ultraviolet light may be carried out in a similar manner to the suspension of polymer beads in a water immiscible liquid as described above.

The following is an illustration of the present invention.

EXAMPLE

A liquid initiator composition was prepared by dissolving Darrocur 1173 (2-Hydroxy-2-methylpropio phenone) liquid grade initiator into a liquid polyethylene glycol, such as PEG 200, 300 or 400.

The water-soluble polymer was prepared by the gel polymerisation of a solution of water-soluble monomer. The hydrated gel polymer thus formed undergoes size reduction to provide gel particles or gel chips having a size in the region of 3 to 4 mm.

The liquid initiator composition was sprayed on to gel chips and these chips are either placed on to a laboratory band drying system (see FIG. 1) or on to a laboratory fluid bed drier (see FIG. 2) and subsequently irradiated with ultraviolet light from a 400 W laboratory flood system. The dose of ultraviolet initiator was about 500 ppm based on weight of polymer. The treatment took place during the drying process. The total irradiance was about 14 mW/cm². A reduction in a free acrylamide was seen after five minutes of ultraviolet treatment and this was reduced to less than 100 ppm after 15 to 20 minutes.

The invention claimed is:

1. A method of reducing unreacted monomer in a water-soluble or water swellable polymer comprising the steps,
   i) applying an ultraviolet initiator to the surface of the polymer and
   ii) irradiating the polymer with ultraviolet light,
wherein the ultraviolet initiator is dissolved or dispersed in an anhydrous liquid medium and in which the liquid medium comprises an organic compound, wherein the organic compound is an hydroxyl terminated polyalkylene glycol.

2. A method according to claim 1 in which the organic compound is polyethylene glycol.

3. A method according to claim 2 in which the polyethylene glycol has a molecular weight between 200 and 600.

4. A method according to claim 1 in which the ultraviolet initiator is dispersed or emulsified in the liquid medium.

5. A method according to claim 1 in which the polymer is a polyacrylamide and the unreacted monomer is acrylamide.

6. A method according to claim 1 in which the ultraviolet initiator is a compound of formula:

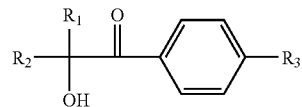

wherein $R_1$ and $R_2$ are each independently $C_{1-3}$ alkyl or together form a $C_{4-8}$ cycloaliphatic ring, $R_3$ is H, $C_{1-2}$ alkyl or —O(CH$_2$CH$_2$)$_n$OH and n is 1-20.

7. A method according to claim 6 in which the ultra violet initiator is a compound of formula:

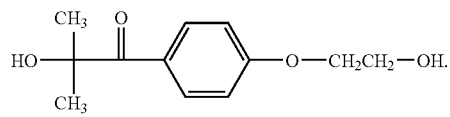

8. A method according to claim 6 in which the ultra violet initiator is a compound of formula:

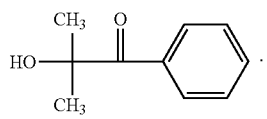

9. A method according to claim 1 in which the ultraviolet light is in the UVA or UVB ranges.

10. A method according to claim 1 in which the ultraviolet light has an intensity up to 600 mW/cm².

11. A method according to claim 1 in which the polymer is made by gel polymerisation to form a hydrated gel polymer, comminuting the hydrated gel polymer to form gel chips, drying the gel chips and grinding the dried gel chips to form a powder.

12. A method according to claim 11 in which ultraviolet initiator is applied to the surface of the gel chips.

13. A method according to claim 11 in which the ultraviolet initiator is applied simultaneous with or subsequent to comminuting the hydrated gel polymer.

14. A method according to claim 11 in which a lubricant is applied when comminuting the hydrated gel polymer and the ultraviolet initiator is comprised in the lubricant.

15. A method according to claim 1 in which the polymer is particulate and has a particle size diameter up to 15 mm.

16. A method according to claim 1 in which the polymer is made by reverse phase polymerisation.

17. A method according to claim 16 in which the polymer is made by reverse phase suspension polymerisation in a continuous phase water immiscible liquid to form polymeric beads and in which the beads are separated from the water immiscible liquid, wherein the ultraviolet initiator is applied to the polymeric beads either by introducing the ultraviolet initiator into the continuous phase water immiscible liquid after completion of the polymerisation or by applying the ultraviolet initiator to the surface of the polymeric beads after separation from the continuous phase water immiscible liquid.

18. A method according to claim 16 in which the polymer is made by reverse phase emulsion polymerisation in a continuous phase water immiscible liquid to form an emulsion product, which is optionally dehydrated, and in which the ultraviolet initiator is introduced into the continuous phase water immiscible liquid after completion of the polymerisation.

* * * * *